United States Patent
Hammerschmidt

(10) Patent No.: US 7,121,138 B2
(45) Date of Patent: Oct. 17, 2006

(54) APPARATUS AND METHOD FOR DETECTING A TIRE DEFORMATION OF A VEHICLE TIRE

(75) Inventor: Dirk Hammerschmidt, Villach (AT)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/932,526

(22) Filed: Sep. 2, 2004

(65) Prior Publication Data
US 2005/0044945 A1     Mar. 3, 2005

(30) Foreign Application Priority Data
Sep. 2, 2003   (DE) ............................. 103 40 408
Oct. 24, 2003  (DE) ............................. 103 49 618

(51) Int. Cl.
*B60C 23/02* (2006.01)
(52) U.S. Cl. .................................................. 73/146.3
(58) Field of Classification Search .............. 73/146, 73/146.3
See application file for complete search history.

(56) References Cited

U.S. PATENT DOCUMENTS

| 5,827,975 A | 10/1998 | De Jager et al. ............... 73/828 |
| 2002/0075144 A1* | 6/2002 | DeZorzi ..................... 340/442 |
| 2002/0087250 A1* | 7/2002 | Pacsai ......................... 701/78 |
| 2003/0070477 A1* | 4/2003 | Fischer et al. ................ 73/146 |
| 2003/0121319 A1* | 7/2003 | Kojima et al. ............. 73/146.2 |
| 2004/0050151 A1* | 3/2004 | Kojima ........................ 73/146 |
| 2004/0075545 A1* | 4/2004 | Yonetani et al. ............ 340/444 |
| 2005/0057348 A1* | 3/2005 | Hammerschmidt ......... 340/445 |
| 2005/0126273 A1* | 6/2005 | Hrabal ........................ 73/146 |

* cited by examiner

*Primary Examiner*—Edward Lefkowitz
*Assistant Examiner*—George P. Bonanto
(74) *Attorney, Agent, or Firm*—Baker Botts L.L.P.

(57) ABSTRACT

An apparatus for detecting a tire deformation of a vehicle tire includes a tire pressure sensor for sensing a tire pressure, a signal processor configured to provide a signal indicating the tire deformation based on a difference between the tire pressure at a first time and the tire pressure at a second time. What is achieved thereby is that a tire deformation may efficiently be sensed.

14 Claims, 3 Drawing Sheets

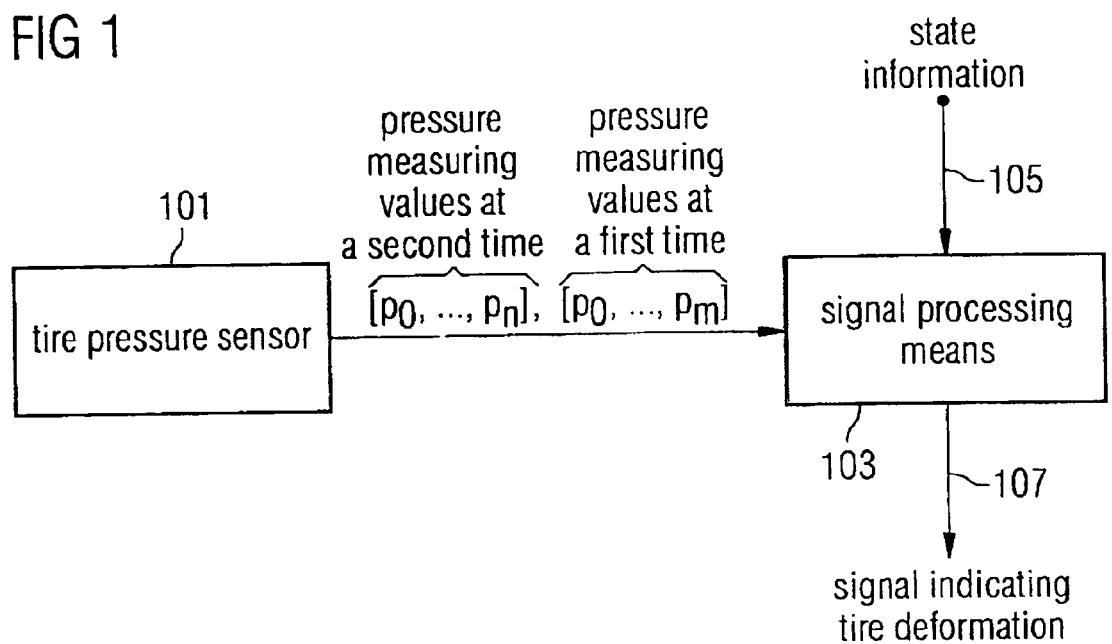

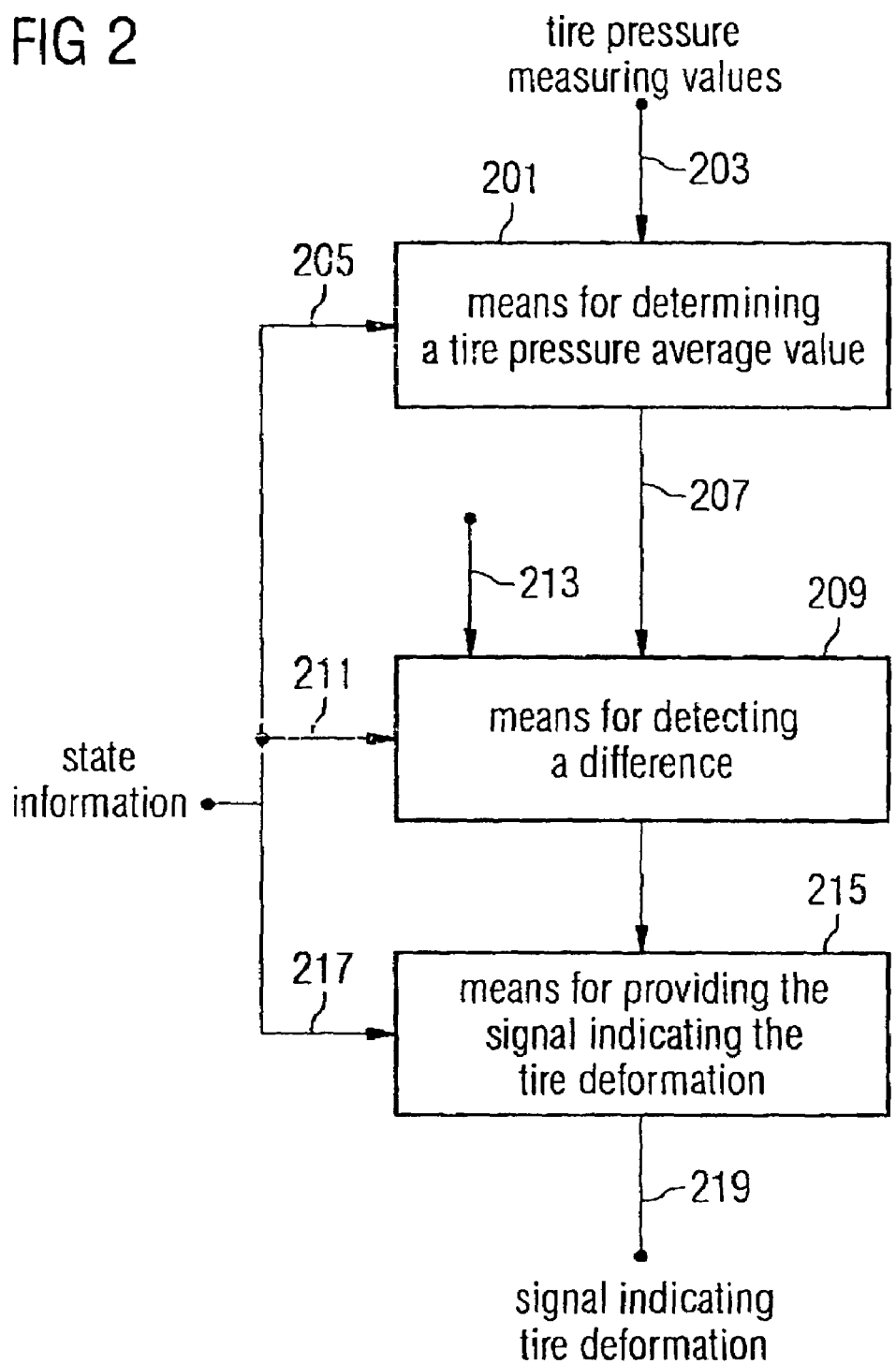

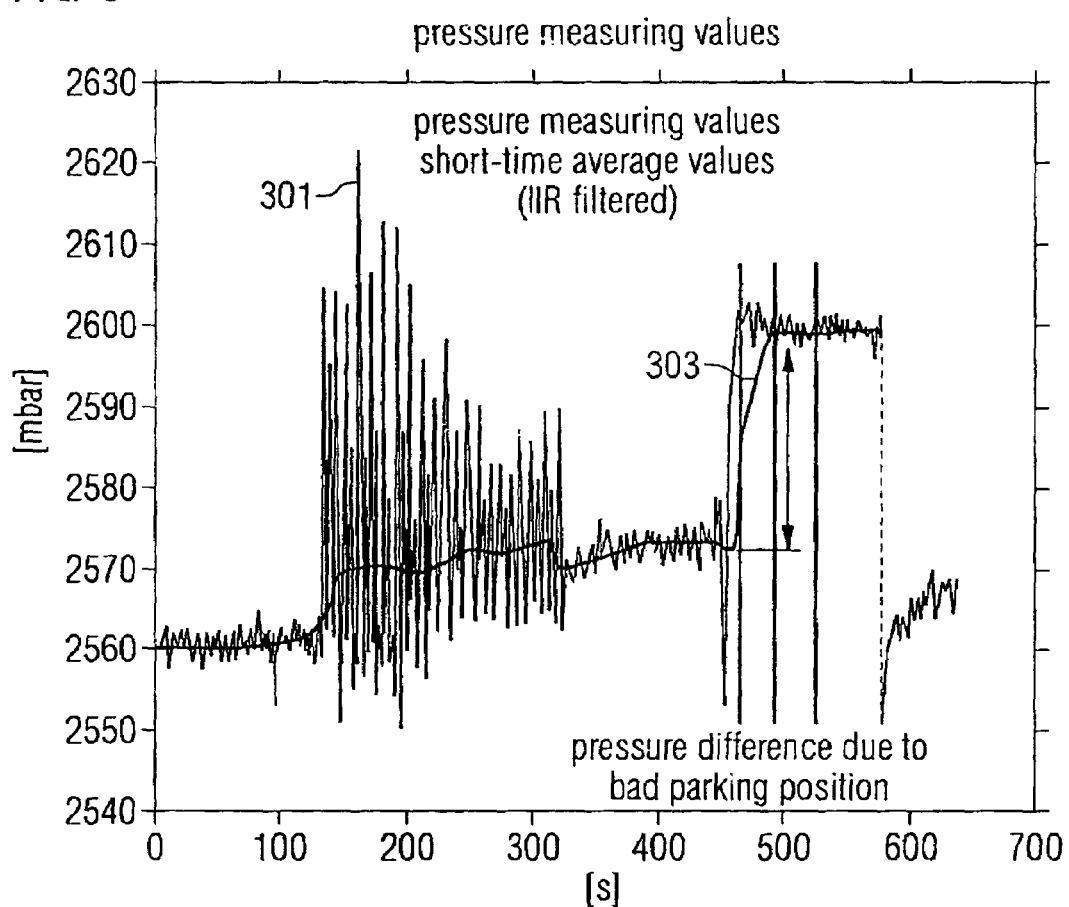

APPARATUS AND METHOD FOR DETECTING A TIRE DEFORMATION OF A VEHICLE TIRE

PRIORITY

This application claims priority to German application No. 103 40 408.2 filed Sep. 2, 2003 and German Patent application No. 103 49 618.1 filed on Oct. 24, 2003.

TECHNICAL FIELD OF THE INVENTION

The invention relates to a detection of a tire deformation of a vehicle tire to prevent damage thereof.

DESCRIPTION OF THE RELATED ART

While automatic tire pressure monitoring systems that automatically inform the driver when there is reduced pressure in one of the tires exist in modern vehicles, here only pressure values from a sensor located in a tire are measured and compared to a reference value, for example 2.1 bar, so that, if the value drops below the reference value, an information signal may be produced.

Vehicle tires are subject to structural damages when they remain in unfavorable strain positions for a long time. This may be the case, for example, when parking at the side of the road, if, unnoticed by the driver, the vehicle is left standing on a sidewalk edge. This may also occur when the driver does not notice that the vehicle is parked on objects, for example on larger pieces of gravel or on beverage cans, that are frequently found on the streets.

SUMMARY OF THE INVENTION

It is the object of the present invention to provide a concept for detecting a tire deformation.

In accordance with a first aspect, the present invention provides an apparatus for detecting a tire deformation of a vehicle tire, having a tire pressure sensor for sensing a tire pressure, and a signal processor configured to provide a signal indicating the tire deformation based on a difference between the tire pressure at a first time and the tire pressure at a second time.

In accordance with a second aspect, the present invention provides a method for detecting a tire deformation of a vehicle tire, having the steps of sensing a tire pressure at a first time, sensing a tire pressure at a second time, determining a difference between the sensed tire pressures, and providing a signal indicating the tire deformation based on the sensed difference.

In accordance with a third aspect, the present invention provides a computer program with a program code for carrying out the method for detecting a tire deformation of a vehicle tire, having the steps of sensing a tire pressure at a first time, sensing a tire pressure at a second time, determining a difference between the sensed tire pressures, and providing a signal indicating the tire deformation based on the sensed difference, when the program runs on a computer.

Preferably the inventive apparatus for detecting a tire deformation of a vehicle tire comprises a tire pressure sensor for measuring a tire pressure, and an apparatus for distinguishing two states, as well as a signal processing means configured to provide a signal indicating the tire deformation based on a difference between the sensed tire pressure at a first time and the sensed tire pressure at a second time. The inventive method preferably includes the following steps: measuring a tire pressure, detecting a change in state (further sensors, such as an acceleration sensor, or external signals, such as the speed of the vehicle, the rotational speed of the wheels, the position of the ignition switch, etc., may be used for this, or an evaluation of the pressure curve may be carried out), determining a difference between the sensed tire pressure curves at different times or in both states, and producing a signal indicating the tire deformation.

The present invention is based on the finding that a tire deformation may be sensed due to a change in tire pressure, particularly, however, due to an increase in tire pressure. The invention makes use of the fact that, according to the gas law, a change in pressure in a tire is inversely proportional to the change in volume. If, for example, a large deformation of the tire occurs when parking the vehicle, for example by an edge indenting a tread, the volume is reduced and the pressure increases. In a favorable parking position, i.e. when no tire deformation occurs, the tire pressure corresponds, for example, to an average tire pressure value present in the tire before parking. A warning may thus be derived when checking if, after parking the vehicle, a difference in pressure has occurred, for example, relative to an average value of the pressure before parking.

One advantage of the present invention is that a tire deformation may be sensed before a tire is damaged. So, due to the inventive concept, the driver may detect whether, for example, maintaining the possibly unfavorable parking position may cause tire damage.

BRIEF DESCRIPTION OF THE DRAWINGS

Preferred embodiments of the present invention are explained in detail in the following with respect to the accompanying drawings, in which:

FIG. 1 is an embodiment of an inventive apparatus for detecting a tire deformation;

FIG. 2 is an embodiment of a signal processing means for providing a signal indicating a tire pressure deformation;

FIG. 3 shows the curve of the pressure measuring values determined according to the invention and the short-time average values.

DESCRIPTION OF THE PREFERRED EMBODIMENTS

FIG. 1 shows a first embodiment of an inventive apparatus for detecting a tire deformation of a vehicle tire.

The apparatus for detecting the tire deformation shown in FIG. 1 includes a tire pressure sensor 101 that may be located in a wheel tire not shown in FIG. 1. The tire pressure sensor is configured to measure the tire pressure and to send the pressure measuring values to a signal processing means 103. The signal processing means 103 comprises a further optional input 105 as well as an output 107.

In the following, the functionality of the structure shown in FIG. 1 is explained.

As has already been mentioned, the tire pressure sensor 101 may be located in a wheel tire, for example on the valve or on the rim. The tire pressure sensor 101 is configured to measure tire pressure measuring values and to provide them to the inventive signal processing means 103.

The tire pressure sensor provides the pressure values. The decision whether a change from driving to parking may be assumed is made in the signal processing with or without the help of further signals. This signal processing may be performed both in the tire or also in a central unit. This is substantially decisive of which additional signals are available. In the tire, for example, an acceleration sensor may be provided, or outside information about the rotational speed of the wheels from the ABS or information about the position of the ignition switch may be provided.

As is indicated in FIG. 1, the tire pressure sensor 101 provides the pressure measuring values for a first time/state marked $[p_0, \ldots, p_m]$. The pressure measuring values for a second time, however, are marked by $[p_0, \ldots, p_n]$. The tire pressure sensor 101 provides m+1 measuring values for the first time and n+1 measuring values for the second time. The number of measuring values for the first and the second time, however, may be equal. Departing from the assumption, that, for example, the second time follows the first time, a first group of the measuring values for a first time are measured first. Subsequently, a second group of the measuring values for the second time are measured, as indicated in FIG. 1. Based on the measuring values as well as an optional state information including information about a current state, for example parking or movement, or information about a change in state, for example change from the driving state to a parking state, the signal indicating the tire deformation is produced. The measuring value sequences are not differentiated by definition, but only result from the state decision made later on. The first time, for example, may be in the first state. The second time may be in the second state. The first state and the second state may further be two different vehicle movement states.

Departing from the tire pressure measuring values provided by the tire pressure sensor 101, the signal processing means 103 is configured to decide, on the basis of the history of the pressure signals or additional information measured or provided from outside (state information), whether and when a first state (for example movement) has changed into a second state (for example parking). Further, a signal indicating the tire deformation is produced on the basis of the tire pressure measuring values and the decision on the change in state, and is output at the output 107. At the input 105, the signal processing means 103 is optionally provided with additional information for deriving or confirming the change in state in the form of, for example, an information signal. This information signal may be produced, for example, by a further means located in the inventive tire pressure sensor 101. This means for producing the information signal indicating the state may be based, for example, on a detection of the centrifugal forces in a mobile vehicle tire. The information signals, however, may also be supplied from outside and contain, for example, information about the rotational speed of the wheels measured by the ABS, the steering wheel position, the driving speed, the position of the ignition switch and the opening of a door.

According to a further embodiment, the inventive apparatus further includes a means for providing additional information, the additional information indicating a parking state of the vehicle. In this case, the signal processing means 103 is configured to provide the signal indicating tire deformation depending on the state information.

The state information may further include information about a first state and information about a second state of the vehicle, wherein the states may be the states already mentioned. Furthermore, the state information may include information about a change in state, for example about a change from the driving state to the parking state.

The apparatus for detecting a tire pressure deformation shown in FIG. 1 may, for example, be located entirely in a wheel tire. Here, the tire pressure sensor 101 as well as the signal processing means 103 are integrated on a signal processing microelectronic device and located in the vehicle tire. Alternatively, the tire pressure sensor 101 may transmit the pressure measuring values in the form of transmission signals to a remotely located signal processing means. For this, the tire pressure sensor 101 may comprise a radio transmitter converting the tire pressure measuring values (pressure measuring values) to a high-frequency signal and transmitting the high-frequency signal, for example via a loop or strip antenna, to the remote signal processing means 103. The signal processing means 103 is equipped with a radio receiver receiving the radio signals and detecting the pressure measuring values. In this case, the signal processing means 103 may, for example, be part of a centrally located control means. Furthermore, both in the tire and the central unit connected by radio there may be parts of the signal processing, if this, for example, reduces the amount of data to be transmitted.

The tire pressure sensor may, for example, be located in only one tire, for example in a front tire. Preferably, however, each tire is equipped with a tire pressure sensor, so that all four wheel tires may be checked for a deformation. If the respective tire pressure sensors are integrated in a chip together with a respective signal processing means, the signals indicating the tire deformation that are associated with a respective tire are sent, for example, to a control unit (evaluating unit) associated with the respective tire pressure sensor and integrated in the respective tire or in an interior of the vehicle, and are further processed by the same. Alternatively, however, as has already been mentioned above, each tire may be equipped with a tire pressure sensor sending the signals to a centrally located signal processing means that may be integrated in the vehicle. In this case, the pressure measuring values provided by the four tire pressure sensors are processed by only one central signal processing means. Besides a signal indicating the tire deformation, the signal processing means 103 optionally also provides information on which tire this signal may now be associated with.

Depending on the design of the apparatus for detecting a tire deformation, the pressure in the tires may be measured in time intervals that are, for example, shorter than the period of time intended for a detection of a wrong parking position. A transmission of the measuring data is then performed in adaptively adjustable time intervals. Alternatively, the time intervals are not controlled adaptively. Preferably, the time intervals are shorter than a time that is maximally allowed to pass until a message of the unfavorable parking position is given. When the vehicle is parked and when the tire is in a deformed state, this leads to a pressure message that differs, for example, from an average value of the past measuring values (for example the pressure measuring values sensed in vehicle movement) and does not return to this average value. If this permanent deviation from the previous average value occurs in connection with features characterizing the parking of the vehicle (for example resting state), a warning signal (a signal indicating the tire deformation) is output to check the parking position of the wheels.

In FIG. 2 an embodiment of a structure of an inventive signal processing means is shown.

The signal processing means shown in FIG. 2 comprises a means 201 for determining a tire pressure average value, that is equipped with a first input 203, a second input 205 as well as an output 207. The output 207 of the means 201 for determining the tire pressure average value is coupled with a means 209 for sensing a difference. The means 209 for sensing the difference further has an input 211 as well as, optionally, a further input 213. An output of the means 209 for sensing the difference is coupled with a means 215 for providing the signal indicating the tire deformation. The means 215 comprises an input 217 as well as an output 219.

The inputs 205, 211 and 217 of the means 201 for determining the tire pressure average value, of the means 209 for sensing the difference as well as of the means 215 for providing the signal indicating the tire deformation are coupled with each other and equipped with a terminal to which a signal is appliable that indicates, for example, the state. At this point, it is to be understood that the inputs 205, 211 and 217 are connected to each other only for illustrating the inventive concept so that each of the means 201, 219 and 215 receives information about the state. According to a further embodiment, the information about the state is, for example, only provided to the respective means if this information is required by the respective means. Alternatively, each of the hierarchical levels of this signal processing may be provided with different information. For example, the means for determining a tire pressure average value may detect the information about a jump in the pressure curve and pass it on to the means for sensing a difference. The latter may additionally obtain the information about the centrifugal force or the rotational speed of the wheels from outside in order to decide whether the pressure jump corresponds to a relevant and static deformation. The means for providing the deformation signal may then include additional information about the position of the ignition switch or the opening of a door or also the duration of the deformation state in order to decide whether a warning message should be output.

In the following, the functionality of the signal processing structure shown in FIG. 2 is explained.

The means 201 for determining the tire pressure average value comprises the input 203 to which the tire pressure measuring values provided, for example, by a tire pressure sensor of the form 101 are applicable. If the tire pressure measuring values are tire pressure measuring values sensed in the first state, for example in movement, the means 201 for determining the tire pressure average value is configured to determine the tire pressure average value and to provide a value based on the determined tire pressure average value at the output 207.

For determining the average value, the means 201 for determining may add up, for example, a number of the tire pressure measuring values and divide the result of this addition by the number or may perform a low-pass filtering, for example a digital low-pass filtering, by means of a digital FIR filter with the same coefficients.

The value based on the tire average value may, however, also be a square of the tire pressure average value.

On the basis of the value that is to be output at the output 207 as well as a further value based on the tire pressure in the further state (for example stop or motor shut-down), the signal indicating the tire deformation is produced by the signal processing means shown in FIG. 2.

For this, the means 209 senses the difference between the value and the further value. The result of this sensed difference is provided in the form of a signal indicating the difference to the means 215 for providing the signal indicating the tire deformation. Depending on the first and the second state and the additional information, the means 215 provides the signal indicating the tire deformation via the output 219.

The tire pressure measuring values provided to the means 201 are preferably filtered by means of an IIR low-pass filter (IIR=infinite impulse response). A hardware of low complexity may thus be used in determining the tire pressure average values. Furthermore, the tire pressure average values may be determined without a number of the measuring values, for example 100, having to be set.

The measuring rate at which the tire pressure sensor senses successive measuring values may, for example, be equal independent of the state. According to a further embodiment, the measuring rate may, however, be different depending on the state, so that the tire pressure sensor changes the measuring rate depending on the state. The measuring times in the driving state may thus be different from those in the state of the rest, wherein, for example, there is a higher measuring rate in the driving state than in the resting state. In the case of a change between driving and parking, there is preferably a waiting time, within which the higher measuring rate of the driving state is maintained.

Based on the value provided by the means 201 via the output 207 as well as the further value applied to the input 213, the means 209 determines the difference by, for example, determining a difference in pressure. Here, a difference in pressure between the value indicating the tire pressure average value in the first state and tire pressure measuring values obtained in the second state is determined. The difference may be output, for example, in the form of a signal directly characterizing the difference. Alternatively, however, an amount of the difference or a square of the difference may be output to the means 215 for providing the signal indicating the tire deformation.

According to a further embodiment, the means 201 for determining is further configured to determine a value based on the tire pressure average value in the second state, for example in the resting state, as the further value. In this case, the means 209 for sensing the difference may receive the further value, for example directly the tire pressure average value in the second state, for example via the input 213. Alternatively, the means 209 for sensing the difference comprises only a single input 207 via which both the value and the further value as defined above are receivable.

For determining the tire pressure average value in the second state of movement, the means 201 determines, for example, the average value in the second state from the plurality of the tire pressure measuring values sensed in the second state, wherein a time of a change in state does not necessarily have to be known.

In order to eliminate possible variations of the average values, the means 201 for determining may further be configured to low-pass filter the determined tire pressure average value in the second state, for example by means of an analog or digital low-pass filter. The low-pass filtered tire pressure average value in the second state is then provided, for example, as the further value. Alternatively, the means 201 for determining the tire pressure average values may provide the average values sensed in the first and/or in the second state as the value and/or the further value.

As already mentioned, the tire pressure in the second state (for example in the vehicle resting state) is higher than the tire pressure average value in the first state, i.e. in the state in which the vehicle is moving, due to a tire deformation. The inventive means 215 for providing the signal indicating the tire deformation may be configured to evaluate the difference sensed by the means 213 to provide a signal indicating the tire deformation based on this evaluation, if there is a tire deformation. For example, the means 215 for providing the signal indicating the tire deformation is configured to provide the last-named signal in the second state, if the difference between the value and the further value exceeds a predetermined value, for example 10 mbar.

If the vehicle is, for example, in the first vehicle state, the tire pressure average value is preferably determined from a large number, for example larger than 100, of tire pressure measuring values to use the thus obtained tire pressure average value as a current reference value for the subsequent determining of the difference between the tire pressures. To indicate a tire deformation, the tire pressure average value, for example in the parking state, is determined from a smaller number of values to indicate a deformation quickly.

In the diagram shown in FIG. 3, measuring data (pressure measuring values) for various vehicle states of movement are shown. The measuring data were taken for 2 minutes of parking, for subsequently parking the vehicle 20 times on the edge of a sidewalk, for 2 minutes of parking in a correct parking position, for a renewed parking of the vehicle and subsequent 2 minutes of parking with the wheel on the edge and for 1 minute of correct parking at the end. The pressure was measured in an interval of 0.5 seconds. The pressure measuring values are given in the graph 301. The graph 303 shows the curve of the short-time average values determined on the basis of the pressure measuring values, that were filtered by a filter. In the embodiment shown in FIG. 3, a second order IIR (IIR=infinite impulse response) filter was used comprising, in the z-area, the transmission function given below.

$$H_{IIR}(z) = \left(\frac{1-a}{1-a \cdot z^{-1}}\right)^2$$

Here, a is a constant determining a cut-off frequency of the filter. $z^{-1}$ represents a time delay by a fixed time interval between two sampling times, for example the time interval between two sent values.

If the vehicle is parked with a deformed tire, a static pressure deviation from the previous curve occurs in the form of a jump that is discernible both in the pressure values themselves and in the low-pass filtered average values, and the duration of this deviation depends on the setting of the cut-off frequency by the filter coefficient.

By an evaluation of the pressure values, a jump in the pressure curve may be detected that does not return to the previous (old) average value. As a consequence of the jump, the average value follows the pressure jump so that the filtered short-time average value now reaches a higher value. If this state occurs when the vehicle is being parked, the driver may be warned to cause the vehicle to be parked correctly and thus prevent tire damage. Detecting this time for this warning may be performed, for example, by a tire pressure central unit. This central unit preferably receives the values of the single tire pressure sensors located in the respective wheel as well as other information indicating the state, for example turned-off ignition or resting state (speed=0).

The already mentioned dynamic wake-up system may be used advantageously in this context, for example when the pressure exceeds the short-time average value for a longer period of time, to transmit the values automatically in the shorter possible time interval until the short-time average value has re-approximated itself to the current values. This allows a quick and detailed tracking and detection of the pressure jump, which is, however, not necessarily required.

Alternatively, a detection of a critical pressure curve by filtering and tracking difference and average value for detecting the jump in the pressure curve, as described above, may also be performed directly in the respective tire pressure sensor. In this case, a warning signal (warn flag), for example, will signalize, during the transmission of a measuring value, that a tire pressure deformation has occurred. Particularly in systems with fixed sending intervals that do not comprise dynamic wake-up, an additional transmission may also be trigged when setting the warn flag to shorten the time until a communication of the warning. The comparison with the information that does not depend on the pressure (for example turned-off ignition or resting state), however, should preferably continue to be performed externally.

Depending on the circumstances, the inventive method may be implemented in hardware or in software. The implementation may be performed on a digital storage medium, particularly a floppy disk or a CD with control signals that may be read out electronically, that may cooperate with a programmable computer system so that the corresponding method is carried out. Generally the invention thus also consists in a computer program product with a program code stored on a machine readable carrier for carrying out the inventive method, when the computer program product runs on a computer. In other words, the invention may thus be realized as a computer program with a program code for carrying out the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for detecting a tire deformation of a vehicle tire, comprising:
   a tire pressure sensor for sensing a tire pressure;
   a signal processor configured to provide a signal indicating the tire deformation based on a difference between the tire pressure at a first time and the tire pressure at a second time,
   wherein the signal processor comprises
   a unit for determining a tire pressure average value and for providing a value based on the tire pressure average value;
   a unit for sensing a difference between the value and a further value, wherein the further value is based on the tire pressure at the second time; and
   a unit for providing the signal indicating tire deformation on the basis of the difference,
   wherein the tire pressure at the second time is larger than the tire pressure average value at the first time due to a tire deformation, and
   wherein the unit for providing the signal indicating the tire deformation is configured to provide the signal indicating the tire deformation at the second time, if the difference between the value and the further value exceeds a predetermined value.

2. The apparatus of claim 1, wherein the unit for determining the tire pressure average value is further configured to determine a value based on a tire pressure average value at the second time as the further value.

3. The apparatus of claim 1, further comprising a unit for providing state information, wherein the state information indicates a parking state of the vehicle, wherein the signal processor is configured to provide the signal indicating tire deformation depending on the state information.

4. The apparatus of claim 3, wherein the state information includes information about a first state and information about a second state of the vehicle.

5. The apparatus of claim 3, wherein the state information includes information about a change in state.

6. The apparatus of claim 3, wherein the tire pressure sensor is configured to determine a plurality of tire pressure measuring values within a first time interval in the first state, and to determine a second plurality of tire pressure measuring values within a second time interval in the second state, wherein the first plurality of tire pressure measuring values is larger than the second plurality of tire pressure measuring values.

7. The apparatus of claim 1, wherein the unit for determining further comprises a low-pass filter to determine the tire pressure average value by low-pass filtering, wherein the unit for determining is configured to provide the tire pressure average value as the further value.

8. The apparatus of claim 1, wherein the value based on the tire pressure average value is a square of the tire pressure average value.

9. The apparatus of claim 1, wherein the tire pressure sensor is configured to change a tire pressure measuring rate depending on the time.

10. The apparatus of claim 3, wherein the tire pressure sensor is configured to change a tire pressure measuring rate depending on the state.

11. A method for detecting a tire deformation of a vehicle tire, comprising:

sensing a tire pressure;

providing a signal indicating the tire deformation based on a difference between the tire pressure at a first time and the tire pressure at a second time, wherein providing the signal indicating the tire deformation comprises determining a tire pressure average value and providing a value based on the tire pressure average value;

sensing a difference between the value and a further value, wherein the further value is based on the tire pressure at the second time; and providing the signal indicating tire deformation on the basis of the difference, wherein the tire pressure at the second time is larger than the tire pressure average value at the first time due to a tire deformation, and providing the signal indicating the tire deformation comprises providing the signal indicating the tire deformation at the second time, if the difference between the value and the further value exceeds a predetermined value.

12. The method of claim 11, comprising a step of detecting a parking state.

13. The method of claim 11, including a step of detecting a change in state.

14. A computer readable storage medium having a computer readable program code, said program code when executed on a computer carrying out a method for detecting a tire deformation of a vehicle tire, said method comprising the steps of:

sensing a tire pressure;

providing a signal indicating the tire deformation based on a difference between the tire pressure at a first time and the tire pressure at a second time, wherein providing the signal indicating the tire deformation comprises determining a tire pressure average value and providing a value based on the tire pressure average value;

sensing a difference between the value and a further value, wherein the further value is based on the tire pressure at the second time; and providing the signal indicating tire deformation on the basis of the difference, wherein the tire pressure at the second time is larger than the tire pressure average value at the first time due to a tire deformation, and providing the signal indicating the tire deformation comprises providing the signal indicating the tire deformation at the second time, if the difference between the value and the further value exceeds a predetermined value.

* * * * *